Aug. 13, 1929.   T. F. CONNORS   1,724,342
METHOD OF MAKING TUBULAR METALLIC HANDLES
Filed March 2, 1925
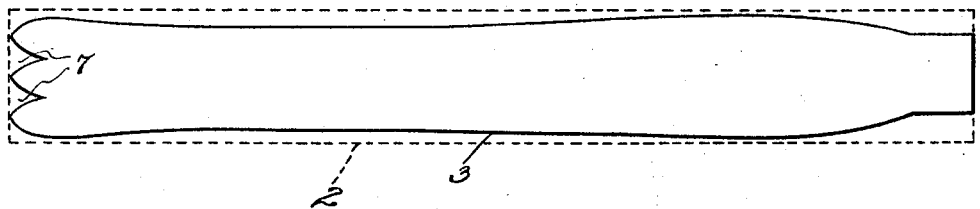
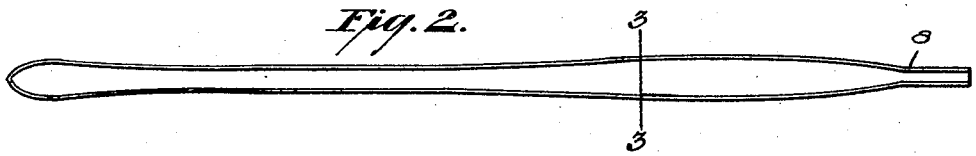
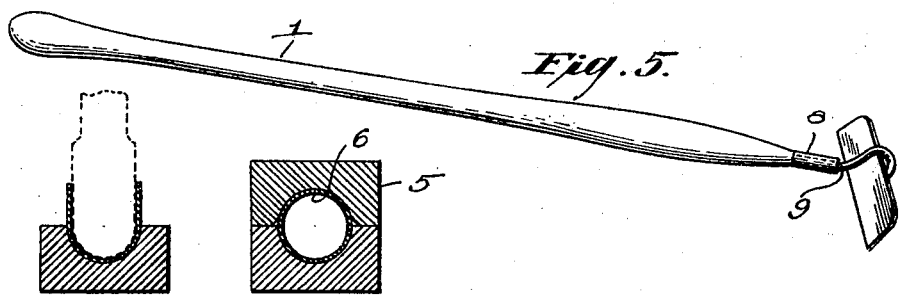
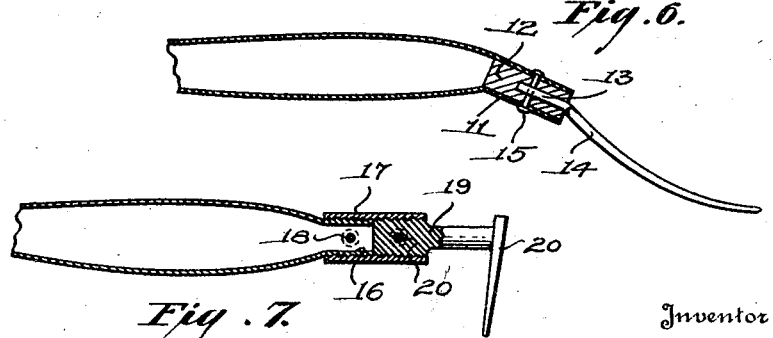
Inventor
Thomas F. Connors
By W. S. McDowell
Attorney Patented Aug. 13, 1929.

1,724,342

UNITED STATES PATENT OFFICE.

THOMAS F. CONNORS, OF COLUMBUS, OHIO, ASSIGNOR TO CHARLES G. McGHIE, OF ST. CATHARINES, ONTARIO, CANADA.

METHOD OF MAKING TUBULAR METALLIC HANDLES.

Application filed March 2, 1925. Serial No. 12,525.

This invention relates to an improved tubular shaft-like metallic handle particularly adapted for use in connection with such load-bearing tools as forks, hoes, rakes, shovels and the like. The primary object of the invention is to produce a metallic handle of this character which is of about the same weight and shape as the ordinary wooden handle now commonly used in this capacity, to the end of providing a tool possessing longer life and service and of more economical construction.

Ash timber is ordinarily used in the manufacture of wooden fork, hoe and rake or shovel handles and the matter of securing proper lumber from which to form these handles is a source of great difficulty to the manufacturer and expense to both the manufacturer and purchaser, since from the time the tree is cut to the finished handle there is a waste of from 75% to 90% to produce the finished product, it is the purpose of the present invention to provide a metallic handle wherein this waste of natural resources may be avoided.

It is therefore another object of the present invention to provide a metallic handle of tubular formation which is shaped to conform to the standard configuration of the ordinary wooden handle and to provide an improved method of forming the same and of attaching it to the operating portion of the tool in such a manner that there will be effected a considerable saving in manufacturing costs, of time required in the manufacture of the handle and the tool forming a part thereof, a construction of superior mechanical strength provided and a considerable saving effected in the cost of manufacture over the commonly used wooden form of handle.

For a further understanding of the invention reference is to be had to the following description and to the accompanying drawings, wherein:

Figure 1 is a plan view of the blank from which the handle is formed,

Figure 2 is a plan view disclosing the blank following the initial bending operation, Figure 3 is a transverse sectional view on the line 3—3 of Figure 2, Figure 4 is a similar view showing the final step of bending the blank to tubular form, Figure 5 is a perspective view of the handle as applied to a hoe, Figure 6 is a longitudinal sectional view disclosing a modified form of connection between the fork handle and the tool body with which it is associated, and Figure 7 is a similar view of a further modification.

Referring more particularly to the drawings the numeral 1 designates in its entirety an improved metallic handle constructed in accordance with the invention. This handle is to be used chiefly in association with garden or earth working implements such as forks, hoes, rakes and shovels and other similar tools and is intended to replace the ordinary form of wooden handle now commonly used for this purpose.

In the manufacture of the handle use is made of a metallic strip 2, preferably of steel and of proper analysis and gauge to give it the necessary strength and wearing qualities and yet when finished the weight of the handle is to be about the same as that of a similar form of wooden handle. This strip is then cut by suitable dies or other means along its longitudinal marginal edges to assume the curved or irregular form disclosed in full lines in Figure 1 and designated by the numeral 3. The flat strip is then placed between primarily forming dies which bend the strip longitudinally to assume substantially a U form throughout the length thereof, and after this operation has been completed the strip is placed between secondary dies 5 which complete the bending operation so that the necessary tubular form of the handle will be provided. The adjacent meeting edges of the strip designated 6, are then welded, brazed or otherwise secured so that the handle will present a rigid tubular construction. The primary and secondary forming dies are shaped to conform to the longitudinal curvature as well as the transverse curvature of the handle so that the elongated tubular form will be preserved. It will be appreciated that the present invention is distinguished from prior constructions wherein tubular handles of substantially uniform diameter throughout are provided, but the present invention consists primarily in the provision of a shaped tubular handle, and the term shaped is employed to describe that form of the handle wherein the same possesses gradually changing diameters throughout its length.

The outer end of the handle may be formed in what is known as a "cupping" die instead of the primary or secondary dies being extended to shape this end of the handle. Preferably, the blank 1 is provided with V cuts 7 and following the bending of the strip into tubular form the outer end of the handle is applied to the cupping die so that the end of the handle will be closed and shaped to the bulbular or globular form disclosed. The slits provided by the V cuts may then be closed and joined by welding or brazing.

The forward end of the handle is shaped to produce a short tubular extension 8 either by the action of the primary or secondary dies or by the use of a separate die structure for this particular operation and localized portion of the handle. The extension 8 comprises a sleeve in which is inserted the shank 9 of a hoe blade or other tool 10. The shank 9 is secured within the extension 8 by means of welding or other suitable fastening means. For example, as shown in Figure 6 the handle terminates in an angularly disposed extension 11 in which is driven a wooden plug 12 having a relatively narrow bore into which is forced by pressure the shank 13 of a fork 14, the shank 13 being slightly larger than the original diameter of the bore of the plug 12 so that when forced into the bore a strong connection will be afforded. The extension 11 prevents the plug 12 from splitting or breaking when the shank is forced into place, and a rivet 15 or the like is passed transversely through the extension 11 the plug 12 and the shank 13 to maintain the parts in assembled order. Again, as shown in Figure 7, the handle is formed at its lower end with an extension 16 that is externally threaded to receive a coupling or sleeve 17 and a rivet 18 is used to unite the coupling securely with the extension 16. The extension 16 is of approximately half the length of the coupling 17 so that the outer end of the latter is provided with a threaded socket for the reception of the threaded shank 19 of the tool 20, if desired, a rivet 21 is then passed through the shank 19 and the coupling 17 to hold the parts against relative rotation. We appreciate that other methods may be used with equal facility for securing the tool element in connection with the handle.

In summary, it will be seen that the present invention provides a shaped elongated metallic handle which is light in weight, economical, strong, and durable and in every material respect an improvement upon the old form of wooden handle. Furthermore, the handle is practically unbreakable in ordinary service and when it is considered from available statistics that there are made and sold each year in this country over one million wooden handles that are used entirely to replace handles in these tools that have been broken, it will be appreciated that the employment of the present invention will result in a considerable economic saving and prevent waste of lumber. Implement manufacturers of this type are obliged to keep on hand large quantities of handles and lumber in storage suitable for handle manufacture and also an additional investment in the form of tools and machinery for the purpose of turning the lumber into the finished handles. These major investments are unnecessary in the manufacture of the present handle which can be quickly made from readily secured standard materials and used immediately following their manufacture.

What is claimed is:

1. The method of forming a long tubular metallic handle having a reduced tubular portion intermediate its ends, which consists in cutting the side edges of the strip to cause them to have the form in outline of the corresponding edges of a longitudinal medial section of the completed handle, then in bending the strip transversely in all transverse sections to substantially U-shape channel form, with the intermediate arcuate portions on varying radii, then in inturning the upper side walls of the channel arcuately, meanwhile maintaining the intermediate portion in arcuate form to form all transverse sections of the handle to substantially circular form but to different diameters in longitudinally differently disposed portions of the handle according to the width of the strip after cutting, and in integrally uniting the adjacent edges of the seam thereby produced by the inturning of the channel side edges.

2. The method of forming a long tubular metallic handle having a reduced tubular portion intermediate its ends, which consists in cutting the side edges of the strip to cause them to have the form in outline of the corresponding edges of a longitudinal medial section of the completed handle, then in bending the strip transversely in all transverse sections to substantially U-shape channel form with the intermediate arcuate portions on varying radii, then in inturning the upper side walls of the channel arcuately, meanwhile maintaining the intermediate portion in arcuate form to form all transverse sections of the handle to substantially circular form but to different diameters in longitudinally differently disposed portions of the handle according to the width of the strip after cutting, and in integrally uniting the adjacent edges of the seam thereby produced by the inturning of the channel side edges, meanwhile effecting closure of an end of the tube by first cutting the corresponding end edge thereof to multi-forked form, each of the forks thereof having convexly rounded sides meeting at a point, and subsequently infolding the sheet metal forks bringing the adjacent side edges of contiguous forks together throughout their respective lengths, and to bring the side edge meeting points of all of the forks together at the axis of the finished handle.

In testimony whereof I affix my signature.

THOMAS F. CONNORS.